(12) United States Patent
Lauria et al.

(10) Patent No.: US 11,788,235 B2
(45) Date of Patent: Oct. 17, 2023

(54) EDIBLE MULTI-RING CAN-HOLDER AND METHODS FOR MANUFACTURING EDIBLE CAN-HOLDERS

(71) Applicant: E6PR S.A.P.I. DE C.V., Mexico City (MX)

(72) Inventors: Gustavo Adolfo Lauria, Brooklyn, NY (US); Juan Francisco Garcia Cendejas, Tlalpan (MX); Marco Antonio Vega Malpica, Darien, CT (US); Jaime Koji Joshina, Miami, FL (US)

(73) Assignee: E6PR S.A.P.I. DE C.V, Mexico City (MX)

( * ) Notice: Subject to any disclaimer, the term of this patent is extended or adjusted under 35 U.S.C. 154(b) by 0 days.

(21) Appl. No.: 15/590,754

(22) Filed: May 9, 2017

(65) Prior Publication Data

US 2018/0016750 A1    Jan. 18, 2018

Related U.S. Application Data

(60) Provisional application No. 62/361,780, filed on Jul. 13, 2016.

(51) Int. Cl.
  *D21J 3/02*   (2006.01)
  *D21B 1/06*   (2006.01)
  (Continued)

(52) U.S. Cl.
  CPC ............. *D21J 3/02* (2013.01); *B65D 65/463* (2013.01); *B65D 71/50* (2013.01); *B65D 71/504* (2013.01);
  (Continued)

(58) Field of Classification Search
  CPC ........ D21H 11/12; D21H 17/01; D21H 21/16; B65D 71/42; B65D 65/463; B65D 65/466;
  (Continued)

(56) References Cited

U.S. PATENT DOCUMENTS 5,186,321 A * 2/1993 Fadus .................... B65D 71/42
                                                          206/151
5,356,518 A   10/1994 Kelley et al.
(Continued)

FOREIGN PATENT DOCUMENTS

WO         03/044279 A1    5/2003

OTHER PUBLICATIONS

Ascheri et al. Preparation Pregelatized Flour by Thermoplastic Extrusion-Based Bagasse Barley and Corn Grits (Year: 2016).*
(Continued)

*Primary Examiner* — Erik Kashnikow
*Assistant Examiner* — Lela S. Davis
(74) *Attorney, Agent, or Firm* — Mayer Brown LLP (57) ABSTRACT

A method for manufacturing an edible, multi-ring, can holder comprises the steps of dehydrating beer by-product to produce a dried pulp, grinding the dried pulp into a powder, forming a pulp slurry by adding the powder into a mixture comprising plant fibers, an environment-friendly, oil-repellent chemical, an environment-friendly, water-repellent chemical, and water, a water-to-other ingredient ratio being approximately 1000 liters of water to approximately 60 kg of the powder, the plant fibers, the oil-repellent chemical, and the water-repellent chemical, injecting the pulp slurry into a mold having an interior cavity in the shape of at least one six-pack ring, and applying pressure and heat to the mold containing the pulp slurry to produce at least one edible six-pack ring.

27 Claims, 7 Drawing Sheets

(51) Int. Cl.
| | |
|---|---|
| D21H 11/12 | (2006.01) |
| D21H 17/01 | (2006.01) |
| D21H 21/16 | (2006.01) |
| B65D 65/46 | (2006.01) |
| B65D 71/50 | (2006.01) |
| D21J 7/00 | (2006.01) |

(52) U.S. Cl.
CPC ............ *D21B 1/063* (2013.01); *D21H 11/12* (2013.01); *D21H 17/01* (2013.01); *D21H 21/16* (2013.01); *D21J 7/00* (2013.01)

(58) Field of Classification Search
CPC .. B65D 71/0003; Y02W 90/13; Y02W 90/10; D21J 3/02; D21J 3/00
See application file for complete search history.

(56) References Cited

U.S. PATENT DOCUMENTS

| | | | |
|---|---|---|---|
| 6,973,760 | B2 | 12/2005 | Moore |
| 8,262,960 | B2 | 9/2012 | Kimura |
| 2004/0003573 | A1 | 1/2004 | Moore |
| 2010/0062248 | A1 | 3/2010 | Kimura et al. |
| 2011/0028427 | A1 | 2/2011 | McManus |
| 2012/0305010 | A1 | 12/2012 | Mishra et al. |
| 2014/0300026 | A1 | 10/2014 | Taccolini |
| 2015/0191287 | A1* | 7/2015 | L'Heureux ............ B65D 71/50 206/476 |

OTHER PUBLICATIONS

Definition of 'edible'. Collins English Dictionary , 2019.*
Mayer et al. DE19521687A1 machine translation (Year: 1996).*
Jongboom et. al EP1024174A1 machine translation (Year: 2000).*
Happiness Moon, Molded Paper Pulp (http://www.paperpulp-tableware.com/molded-paper-pulp.html). (Year: 2014).*
History of paper http://www.indiapapermarket.com/history.asp (Year: 2006).*
Mayer, DE19521687, USPTO-STIC obtained machine translation. (Year: 1995).*
CA 2101414 A 1 (Chambers, MJ ) Jan. 30, 1994 ; p. 2, paragraph 3; p. 3, last paragraph ; p. 4, paragraphs 1, 3; p; p. 5, paragraph 5, p. 6, paragraphs 2, 5; p. 7, paragraphs 1, 4; p. 8, paragraph 4.
Daikin America; Unidyne TG-8811 Technical Data Sheet; Revised Feb. 9, 2016;, https://Daikin-america .com/wp-content/uploads/2013/07 /TDS-TG-018-TG-88 11 -Surface.pdf; full page of Technical data Sheet.
International Search Report of Patent App. No. PCT/US17/40808 dated Sep. 28, 2017.
Niland, 0 'Brewery replaces plastic six-pack rings with fish food' May 19, 2016;, Mashable .com; http://mashable.com/2016/05/20/edible-six-pack-rings-beer/#4e1Wy45d F Gq D; pp. 2-4 of pdf file.

* cited by examiner

EDIBLE MULTI-RING CAN-HOLDER AND METHODS FOR MANUFACTURING EDIBLE CAN-HOLDERS

CROSS-REFERENCE TO RELATED APPLICATIONS

This application claims the priority, under 35 U.S.C. § 119, of U.S. Provisional Patent Application No. 62/361,780 filed Jul. 13, 2016; the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of can holders. The present disclosure relates to edible six-pack or multi-ring can-holders and methods for manufacturing edible can-holders.

BACKGROUND OF THE INVENTION

Canned beverages have been around for at least the 1960s and are now sold by the billions each year. One beer industry statistic indicates that 67,000,000,000 cans of beer are consumed in a year. The website www.theworldcounts.com actually has a counter that tracks the number of aluminum cans consumed for the current calendar year. This counter is based on the assumption that the world's beer and soda consumption uses about 200 billion aluminum cans every year, which is 6,700 cans every second and enough, when laid end-to-end, to span the Earth every 17 hours.

In the U.S., the typical cylindrical (12-ounce) can shape makes it difficult to carry more than a few by one person with one hand. In the 1960s, companies who sold beverages in cans started using plastic "nets" that secured sets of cans and, in particular, six cans (but they can be made to hold any amount of cans, for example, up to 24 cans). These nets began, commonly referred to as six-pack rings, have become so ubiquitous over the past 50+ years that they are now labeled a pollution hazard. One writer reporting a 1987 story by the Associated Press claimed "Marine scientists and environmentalists say an estimated one million seabirds and 100,000 marine mammals are killed each year by six-pack rings and other plastic material they mistake for food." Whether or not this has been proven or is true does not remove the fact that large amounts of plastic not recycled pollutes the Earth and millions of six-pack rings produced each year contribute to this ever-growing problem.

Some efforts have been made to produce the six-pack rings from a material that is photodegradable. Photodegradation occurs when ultraviolet radiation in sunlight illuminates the ring material. Exposure to the sun's ultraviolet rays causes the rings to weaken and become brittle. With prolonged exposure, the chemical structure of the plastic degrades, losing structural integrity. Some photodegradable six-pack ring material loses most of its structural integrity in days. But, the degrading process is slow and requires direct and relatively long exposure to UV radiation from sunlight. Without such exposure, the rings contribute to pollution for years.

Accordingly, it would be desirable to create a ring for beverage cans, e.g., a six-pack ring, that is environmentally friendly and, instead of polluting, contributes beneficially to the planet. Thus, a need exists to overcome the problems with the prior art systems, designs, and processes as discussed above.

SUMMARY OF THE INVENTION

The systems, apparatuses, and methods described provide edible six-pack or multi-ring can-holders and methods for manufacturing edible can-holders that overcome the hereinafore-mentioned disadvantages of the heretofore-known devices and methods of this general type and that is environmentally friendly and, instead of polluting, contributes beneficially to the planet by being, for example, edible by animal life and biodegradable. The systems, apparatuses, and methods provide can-holders with the ability to degrade quickly in the exposure to the environment and to be nutritionally beneficial (i.e., provides some nutrition) when eaten by animal life or, at least, nutritionally neutral (i.e., not harmful).

Not only do the devices and methods herein provide an environmentally friendly product, which is biodegradable and safe to eat by animal life, the devices and methods do so by recycling at least some ingredients that, heretofore, were typically disposed of into either public waste (e.g., ending up in dump sites) or into the aquifer.

With the foregoing and other objects in view, there is provided, a method for manufacturing an edible, multi-ring, can holder comprising the steps of dehydrating beer by-product to produce a dried pulp, grinding the dried pulp into a powder, forming a pulp slurry by adding the powder into a mixture comprising plant fibers, an environment-friendly, oil-repellent chemical, an environment-friendly, water-repellent chemical, and water, a water-to-other ingredient ratio being approximately 1000 liters of water to approximately 60 kg of the powder, the plant fibers, the oil-repellent chemical, and the water-repellent chemical, injecting the pulp slurry into a mold having an interior cavity in the shape of at least one six-pack ring, and applying pressure and heat to the mold containing the pulp slurry to produce at least one edible six-pack ring.

With the objects in view, there is also provided a method for manufacturing an edible, multi-ring, can holder comprising the steps of molding pulp comprising a beer by-product into a shape defining six open rings each sized to securably contain therein a standard soda can in a releasable manner, pressurizing and heating the molded pulp into a form, and allowing the form to dry to produce an edible six-pack ring.

In accordance with another feature, the beer by-product is dried to a level of between approximately 0% moisture and 14% moisture.

In accordance with a further feature, the beer by-product is dried within approximately twenty-four hours after producing the beer to substantially cease spoliation.

In accordance with an added feature, the beer by-product comprises at least one of barley, wheat, corn, rice, rye, and/or oat.

In accordance with an additional feature, the powder has a particulate size of approximately 2 mm.

In accordance with yet another feature, the plant fibers comprise at least one of wheat straw, bamboo, sugar cane, and/or miscanthus.

In accordance with yet a further feature, the plant fibers comprise a mixture of at least two of wheat straw, bamboo, sugar cane, and miscanthus.

In accordance with yet an added feature, the oil-repellent chemical comprises perfluoro alkyl ethyl phosphate.

In accordance with yet an additional feature, the water-repellent chemical comprises alkyl ketene dimer (AKD) emulsion.

In accordance with again another feature, the pulp slurry comprises approximately 65% to approximately 98% by weight of the plant fibers, approximately 0.8% to approximately 1.2% by weight of the oil-repellent chemical, approximately 2% to approximately 8% by weight of the water-repellent chemical, and approximately 0.5% to approximately 30% by weight of the ground pulp byproduct.

In accordance with again a further feature, the pulp slurry comprises approximately 70% to approximately 80% by weight of the plant fibers, approximately 0.05% to approximately 1.1% by weight of the oil-repellent chemical, approximately 1% to approximately 2% by weight of the water-repellent chemical, and approximately 5% to approximately 20% by weight of the ground pulp byproduct.

In accordance with again an added feature, the pulp slurry comprises approximately 87% by weight of unbleached wheat straw, approximately 0.8% by weight of perfluoro alkyl ethyl phosphate, approximately 2.7% by weight of alkyl ketene dimer (AKD) emulsion, approximately 9.5% by weight of barley pulp byproduct, and the water is filtered water.

In accordance with again an additional feature, the pulp slurry has a viscosity prior to injection into the mold of between approximately 0.5 mPa·s and approximately 2 mPa·s.

In accordance with still another feature, the pressure applied to the mold is between approximately 50 MPa and approximately 500 MPa and the temperature applied to the mold is between approximately 80° C. and approximately 500° C.

In accordance with still a further feature, the pulp slurry remains in the mold under pressure and heat for between approximately five seconds and approximately two minutes until substantially all moisture is removed from the pulp slurry.

In accordance with still an added feature, the injecting step is carried out with a mold having a plurality of interior cavities each in the shape of a six-pack ring and the pressure and heat applying step to the mold containing the pulp slurry is carried out to produce a plurality of six-pack rings.

In accordance with still an additional mode, there is provided the step of trimming at least one portion of the at least one six-pack ring.

In accordance with a concomitant mode, there is provided the step of disinfecting the at least one six-pack ring.

Although the systems, apparatuses, and methods are illustrated and described herein as embodied in edible six-pack or multi-ring can-holders and methods for manufacturing edible can-holders, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. In a first exemplary embodiment, an edible six-pack or multi-ring can-holder is made from molded pulp added with byproduct of beer. Advantageously, the edible can-holder is made by first recovering the grain that is used in the process of making beer. When making beer from grain, in particular, barley or wheat (or even corn, rice, rye, and/or oat), the malted grain enters a tank and is combined with water. The mixture enters a process referred to as mashing, in which these ingredients are heated to release sugars from the grain. After being boiled along with various additional ingredients (such as hops for flavor), a product known as wort is produced. The wort and yeast is added into a fermentation tank, in which time sugars are consumed by the yeast to create alcohol over a fermentation period. Liquid beer is removed for bottling, and the non-liquid material left after this fermentation period is waste byproduct. This leftover malt is a significant byproduct of every brewery (which could over eighty percent of all brewery waste).

When the beer making process is finished in the fermentation tank, the malt byproduct contain a lot of heat and humidity. If left alone, the byproduct will start spoiling within twenty-four hours. Referring now to the figures of the drawings in detail and first, particularly to FIG. 1, in a first pulp preparation step 100, the byproduct is dehydrated, which stops spoliation. Common dehydration equipment can be used to dry out the byproduct. The byproduct is dried to a level below approximately 14% moisture to produced dried pulp. The dried pulp is, therefore, able to be stored without spoilage. The dried pulp is packaged and transported to a location where molding of the edible can-holders is performed.

Figure 1:
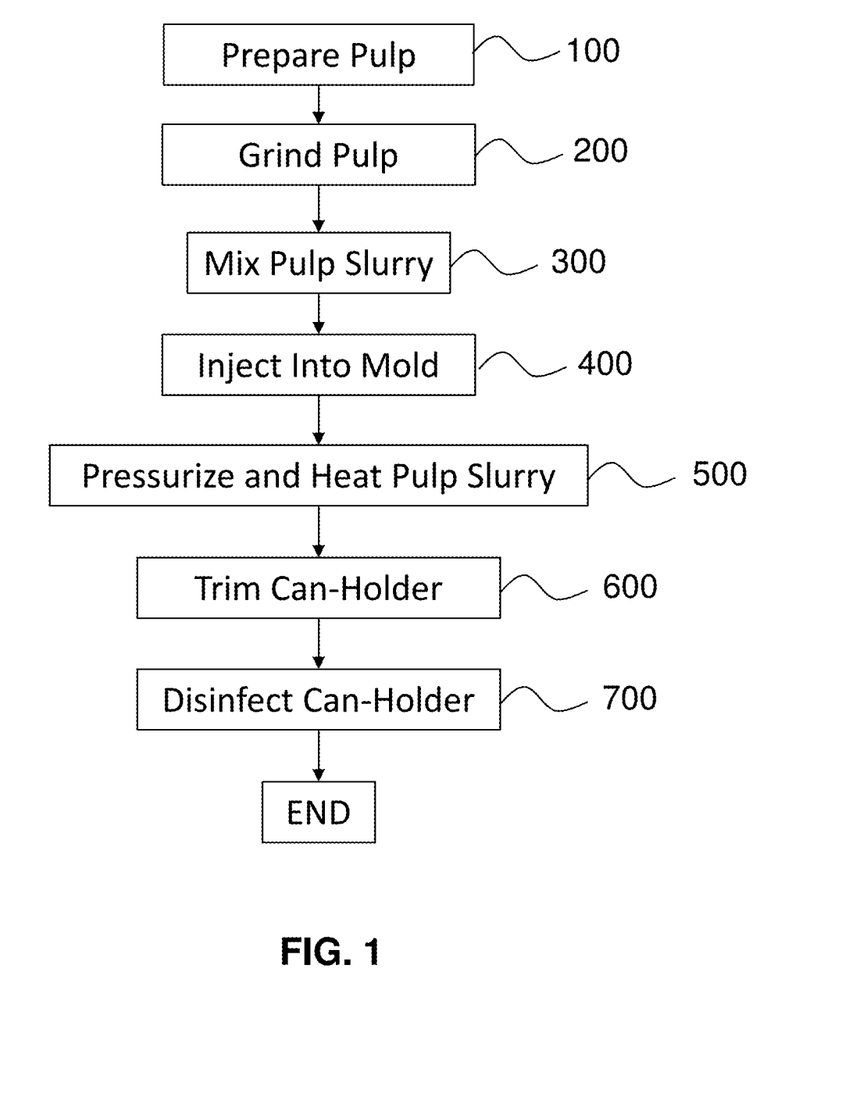
FIG. 1 is a process flow diagram of an exemplary embodiment of a process for manufacturing a biodegradable and edible can-holder.

In a second step 200, the dried pulp is ground into powder. The grinding can be done in one step or in successive steps in which various grinders are used, each outputting a smaller particulate, for example. Depending on the desired final characteristics of the edible can-holder, different grinding processes/machines can be employed. In one exemplary embodiment, the dried pulp is ground using a steel burr grain mill grinder having an output with a particulate size of approximately 2 mm.

In a third step 300, the ground pulp is added as an ingredient to make a pulp slurry. The ingredients of the pulp slurry include water, plant fibers, an environment-friendly oil-repellent chemical, an environment-friendly, water-repellent chemical, and the ground pulp. As used herein, "environment-friendly" and "environmentally friendly," also referred to as eco-friendly, nature-friendly, and green, refer to materials that provide reduced, minimal, or no harm upon ecosystems or the environment, for example, substances that are biodegradable. The plant fibers can include, but are not limited to, wheat straw, bamboo, sugar cane, and/or miscanthus. Only one plant fiber can be used or a mixture of two or more plant fibers can be used. The oil-repellent chemical can include, but is not limited to, perfluoro alkyl ethyl phosphate (an example of which is sold as under the trade name Unidyne TG-8811). The water-repellent chemical can include, but is not limited to, alkyl ketene dimer (AKD) emulsion.

In a first exemplary embodiment, the pulp slurry comprises:
  plant fibers—approximately 65% to approximately 98% by weight;
  oil-repellent chemical—approximately 0.8% to approximately 1.2% by weight;
  water-repellent chemical—approximately 2% to approximately 8% by weight;
  ground pulp byproduct—approximately 0.5% to approximately 30% by weight; and
  water—used to mix all of the ingredients in a ratio of approximately 1000 liters of water to approximately 60 kg of the other materials.

In a second exemplary embodiment, the pulp slurry comprises:
  plant fibers—approximately 70% to approximately 80% by weight;
  oil-repellent chemical—approximately 0.05% to approximately 1.1% by weight;
  water-repellent chemical—approximately 1% to approximately 2% by weight;
  ground pulp byproduct—approximately 5% to approximately 20% by weight; and
  water—used to mix all of the ingredients in a ratio of approximately 1000 liters of water to approximately 60 kg of the other materials.

In a third exemplary embodiment, the pulp slurry comprises:
  unbleached wheat straw—approximately 87% by weight;
  perfluoro alkyl ethyl phosphate—approximately 0.8% by weight;
  alkyl ketene dimer (AKD)—approximately 2.7% by weight;
  barley pulp byproduct—approximately 9.5% by weight; and
  filtered water—used to mix all of the ingredients in a ratio of approximately 1000 liters of water to approximately 60 kg of the other materials.

The final pulp slurry is mixed until it is substantially uniform and is then added, in a fourth step 400, to an input conduit of molding machine, which, in an exemplary embodiment, can be similar to those machines that produce paper pulp dishware. The final pulp slurry has a viscosity of between approximately 0.5 mPa·s and approximately 2 mPa·s.

Figure 2:
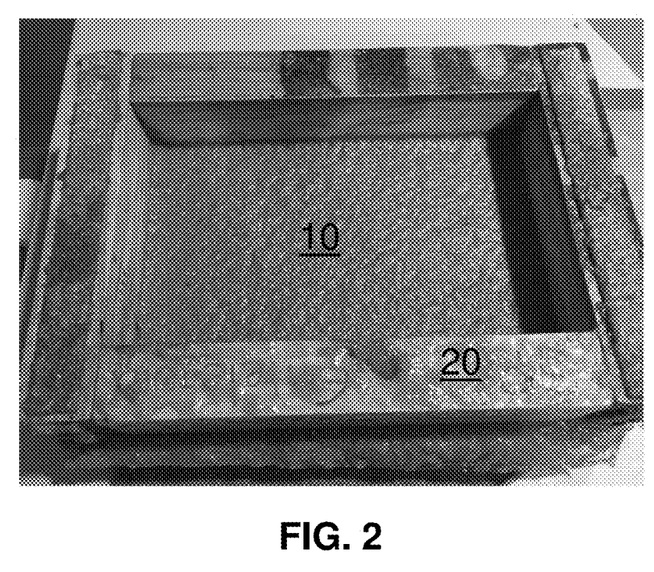
FIG. 2 is a fragmentary, perspective view from above an exemplary embodiment of a mold frame for producing the edible can-holder.
Figure 3:
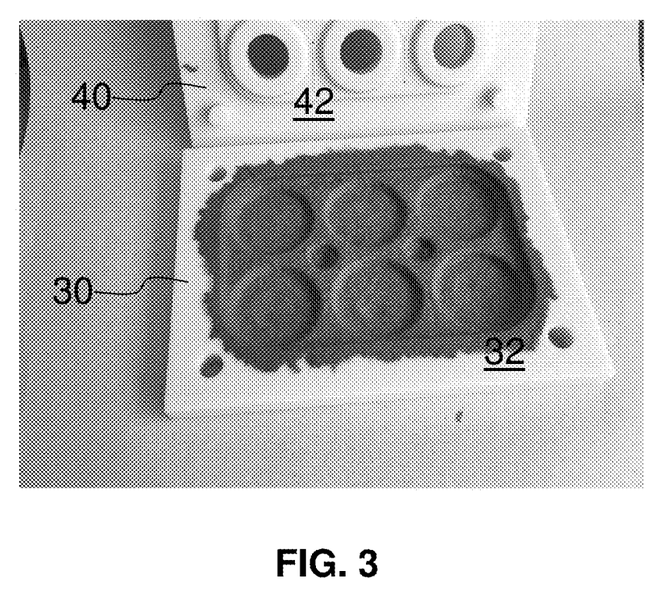
FIG. 3 is a fragmentary, perspective view from above an exemplary embodiment of mating mold parts for producing the edible can-holder with the mold frame.

FIG. 2 shows a first exemplary embodiment of the pulp slurry 10 in a center cavity of a mold frame 20 that is shaped to receive therein a lower press part 30 and an upper press part 40. In this exemplary embodiment, as shown in FIG. 3, a top surface 32 on which the pulp slurry 10 rests within the mold frame 20 has a shape that is intended to produce a first side 52 of an edible can-holder 50 and a bottom surface 42 of the upper press part 40 has a shape that is intended to produce a second side 54 of the edible can-holder 50 opposite the first side 52. The press parts 30, 40 can be (as shown) to move within a separate mold frame 20, or the press parts 30, 40 can have walls to form the entirety of the mold (not illustrated).

Figure 4:
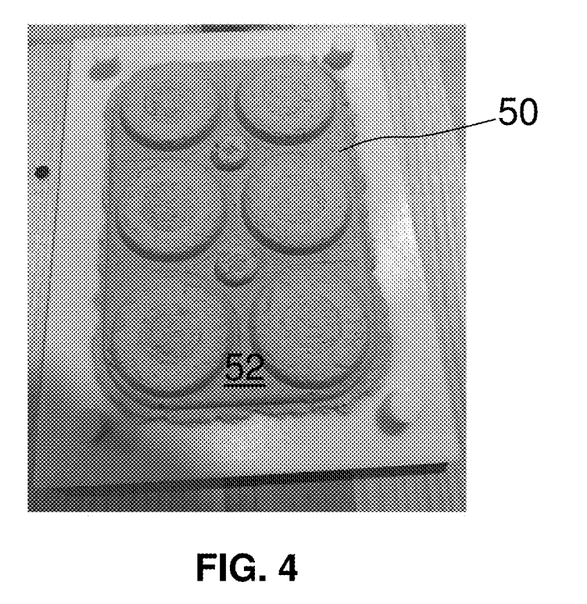
FIG. 4 is a perspective view from above an exemplary embodiment of an untrimmed edible can-holder on a lower mold part.
Figure 5:
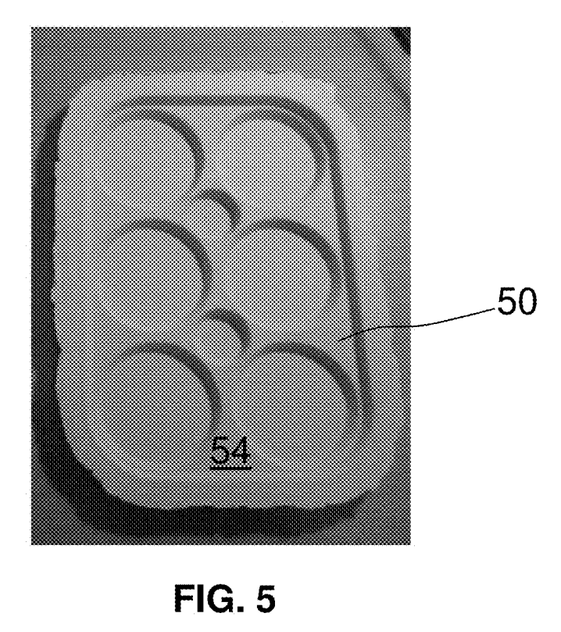
FIG. 5 is a perspective view from below the edible can-holder of FIG. 4 after separation from the mold parts.

In a fifth step 500, the pulp slurry 10 is placed under pressure in the mold assembly 20, 30, 40 and heat is imparted. The pressure is between approximately 50 MPa and approximately 500 MPa and the temperature is between approximately 80° C. and approximately 500° C. The pulp slurry 10 remains in the press for between approximately five seconds and approximately two minutes until substantially all moisture is removed from the edible can-holder 50, which can be seen still attached to the lower press part 30 in FIG. 4.

Figure 6:
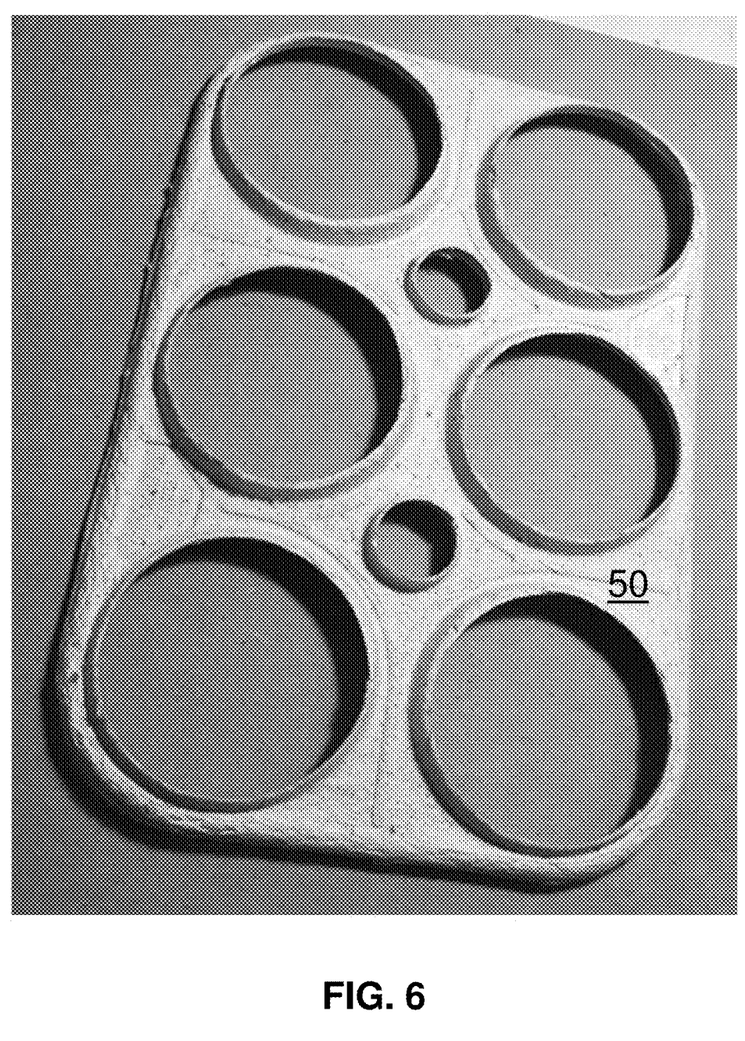
FIG. 6 is a perspective view from above the edible can-holder of FIG. 5 after being trimmed.
Figure 7:
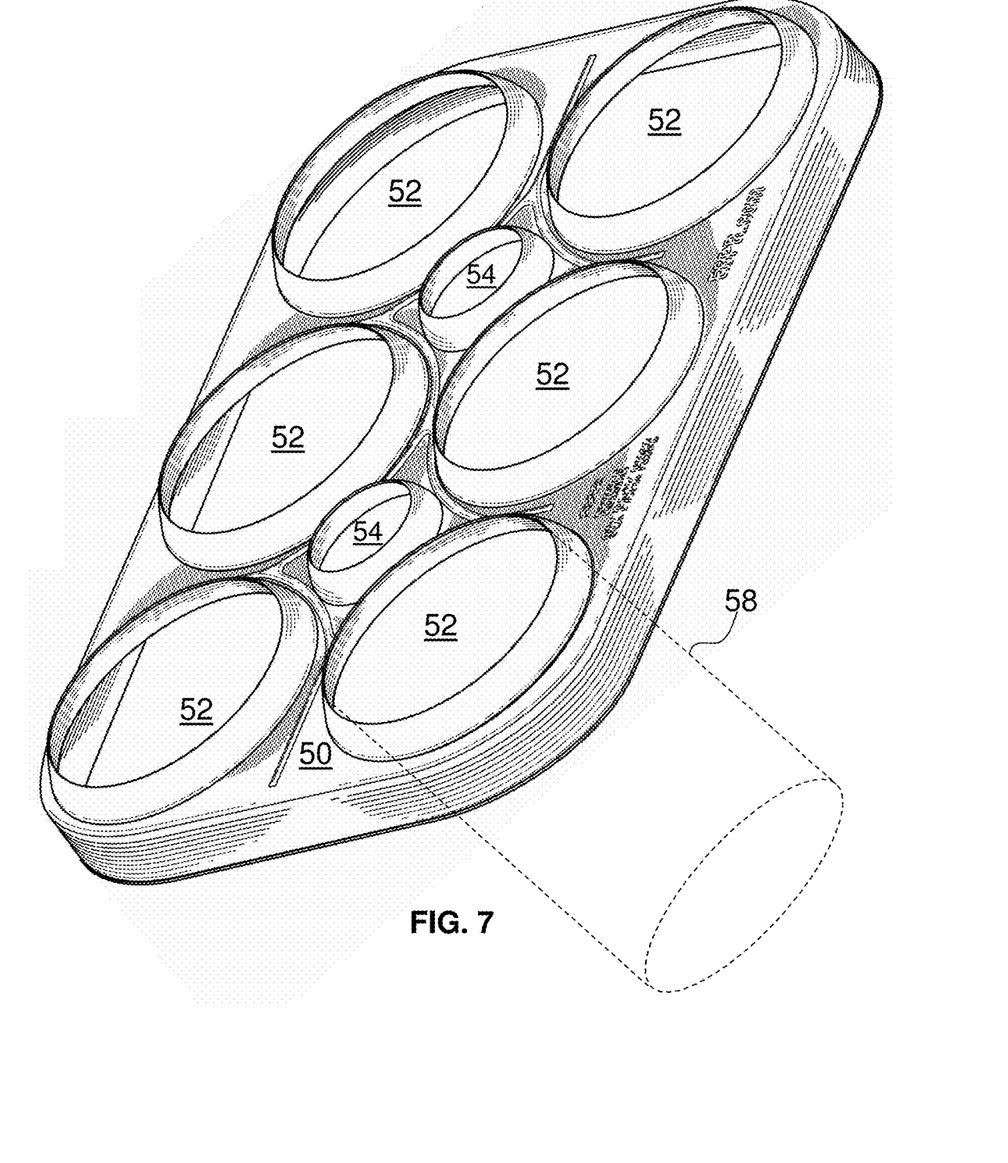
FIG. 7 is a perspective view from above an exemplary embodiment of an edible can-holder.
Figure 8:
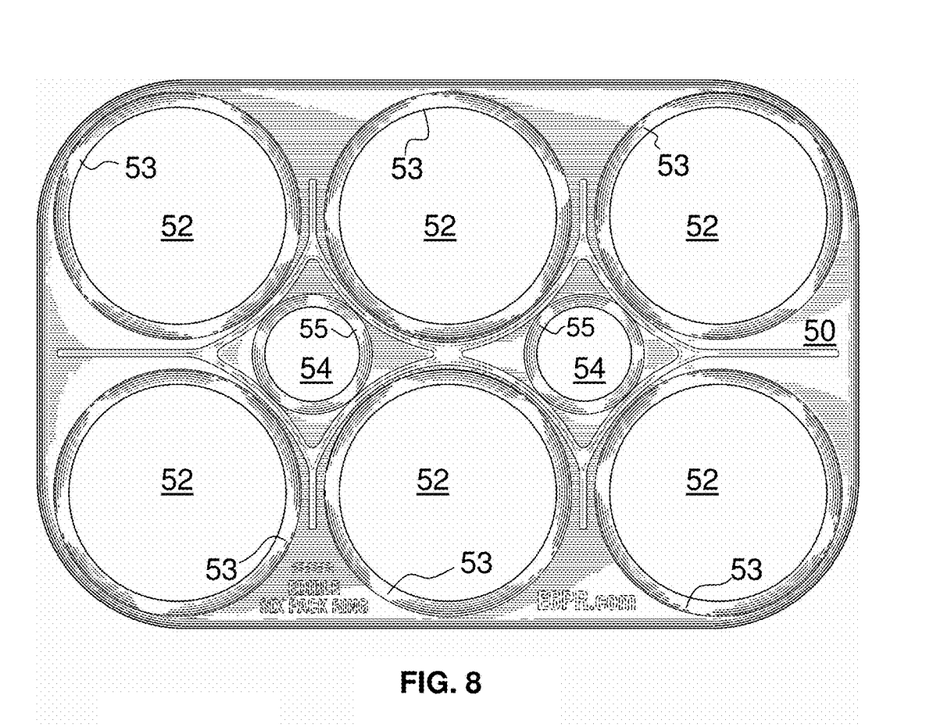
FIG. 8 is a top plan view of the edible can-holder of FIG. 7.
Figure 9:
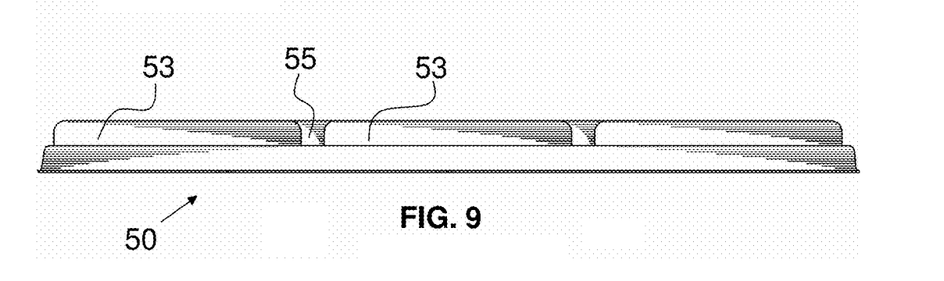
FIG. 9 is a side elevational view of a long side of the edible can-holder of FIG. 7, the opposite side being a mirror-image thereof.
Figure 10:
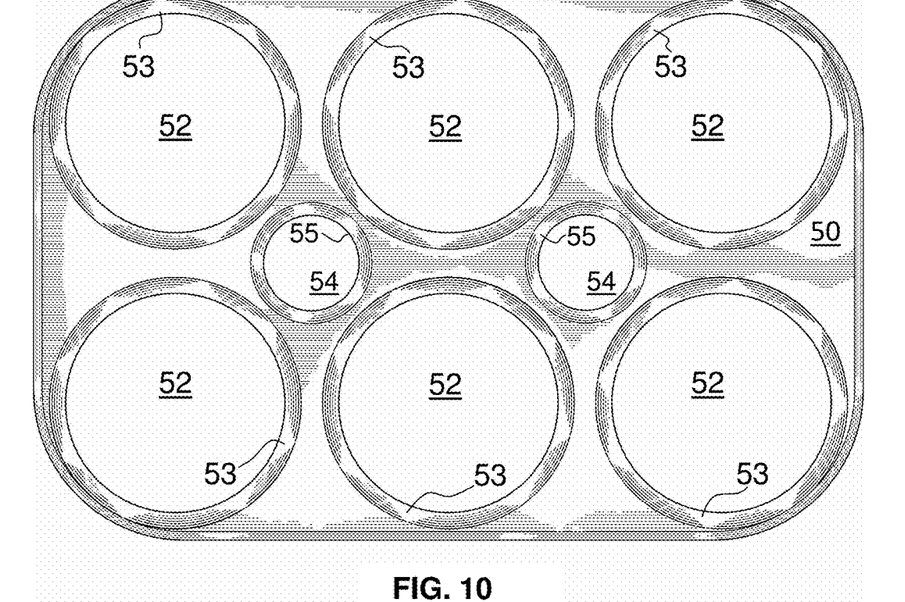
FIG. 10 is a bottom plan view of the edible can-holder of FIG. 7.
Figure 11:
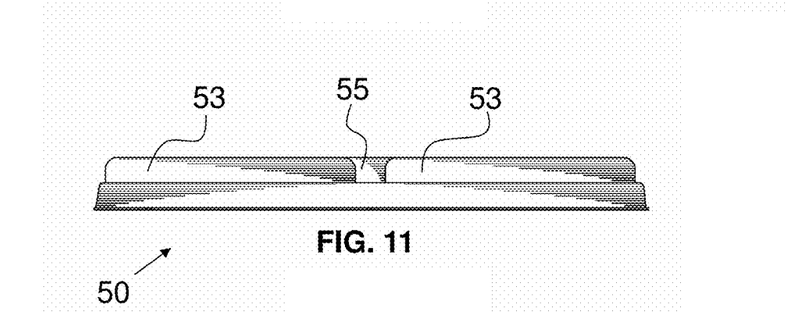
FIG. 11 is a side elevational view of a short side of the edible can-holder of FIG. 7, the opposite side being a mirror-image thereof.

In a sixth step 600, the portions of the edible can-holder 50 that are not needed for holding the beverage cans (e.g., six here) are removed, as is shown in FIG. 6. One exemplary configuration of the edible can-holder 50 is in the form of a six-pack ring shown in FIGS. 7 to 11. The can-holder 50 defines six openings 52 for receiving beverage cans and two openings 54 for receiving a user's fingers, for example. A portion of one beverage can 58 is illustrated in FIG. 7 with dashed lines. The six can openings 52 are surrounded by a partial dome 53 having a shape that can expand slightly to capture a top portion of a beverage can 58. When a beverage can is inserted from below the domes 53, the inner circumference slightly enlarged and then springs back into a groove at the top of the beverage can 58 to releasably but snugly secure the beverage can 58 therein. In this exemplary embodiment, the two finger opening 54 are also surrounded by a partial dome 55. This particular feature is not limited to a partial dome and can take any shape that provides comfort to a user when the user inserts fingers into the openings 54 to hold the can-holder 50 when the openings 52 are filled with beverage cans 58.

In a seventh step 700, the edible can-holder 50 is disinfected and packaged for delivery to purchasers. Depending on the purpose for the final use, some products do not require disinfection.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A method for manufacturing an edible multi-ring can holder consisting of biodegradable materials, comprising:
   dehydrating beer by-product to produce a dried pulp;
   grinding the dried pulp into a powder;
   forming a pulp slurry by adding the powder into a mixture comprising:
   plant fibers;
   an environment-friendly, water-repellent chemical; and water,
   wherein the ratio of water to the powder, the plant fibers, and the environmentally-friendly water-repellent chemical is approximately 1000 liters of water to approximately 60 kg of the powder, the plant fibers, and the environmentally-friendly water-repellent chemical;
   injecting the pulp slurry into a mold having an interior cavity in the shape of at least one multi-ring can holder; and
   applying pressure and heat to the mold containing the pulp slurry to produce at least one edible multi-ring can holder from only biodegradable materials;
   wherein the edible multi-ring can holder has a strength, rigidity, and flexibility suitable to carry beverage cans attached to each ring of the multi-ring can holder by a top of the beverage can; and
   wherein the flexibility of the edible multi-ring can holder allows for an inner circumference of each ring to expand so when the can is inserted the ring is enlarged and then springs back onto the can.

2. The method according to claim 1, wherein the beer by-product is dried to a level of between approximately 0% moisture and 14% moisture.

3. The method according to claim 2, wherein the beer by-product is dried within approximately twenty-four hours after producing the beer.

4. The method according to claim 1, wherein the beer by-product comprises at least one of barley, wheat, corn, rice, rye, and/or oat.

5. The method according to claim 1, wherein the powder has a particulate size of approximately 2 mm.

6. The method according to claim 1, wherein the plant fibers comprise at least one of wheat straw, bamboo, sugar cane, and/or miscanthus.

7. The method according to claim 1, wherein the plant fibers comprise a mixture of at least two of wheat straw, bamboo, sugar cane, and miscanthus.

8. The method according to claim 1, wherein the pulp slurry further comprises an environment-friendly oil-repellent chemical.

9. The method according to claim 1, wherein the water-repellent chemical comprises alkyl ketene dimer (AKD) emulsion.

10. The method according to claim 1, wherein the pulp slurry comprises: approximately 65% to approximately 98% by weight of the plant fibers;
    approximately 2% to approximately 8% by weight of the water-repellent chemical; and
    approximately 0.5% to approximately 30% by weight of the ground pulp byproduct.

11. The method according to claim 1, wherein the pulp slurry comprises: approximately 70% to approximately 80% by weight of the plant fibers;
    approximately 1% to approximately 2% by weight of the water-repellent chemical; and
    approximately 5% to approximately 20% by weight of the ground pulp byproduct.

12. The method according to claim 1, wherein approximately 87% by weight of the plant fiber, and wherein the plant fiber is unbleached wheat straw; approximately 2.7% by weight of the water-repellent chemical, and wherein the water-repellent chemical is alkyl ketene dimer (AKD) Emulsion; approximately 9.5% by weight of the ground pulp byproduct, and wherein the ground pulp byproduct is barley pulp byproduct; and wherein the water is filtered water.

13. The method according to claim 1, wherein the pulp slurry has a viscosity prior to injection into the mold of between approximately 0.5 mPa·s and approximately 2 mPa·s.

14. The method according to claim 1, wherein the pressure applied to the mold is between approximately 50 MPa and approximately 500 MPa and the temperature applied to the mold is between approximately 80° C. and approximately 500° C.

15. The method according to claim 14, wherein the pulp slurry remains in the mold under pressure and heat for between approximately five seconds and approximately two minutes.

16. The method according to claim 1, which further comprises:

carrying out the injecting step with a mold having a plurality of interior cavities each in the shape of a multi-ring can holder; and carrying out the pressure and heat applying step to the mold containing the pulp slurry to produce a plurality of multi-ring can holders.

17. The method according to claim 1, which further comprises trimming at least one portion of the at least one multi-ring can holders.

18. The method according to claim 1, which further comprises disinfecting the at least one multi-ring can holder.

19. A method for manufacturing an edible multi-ring can holder consisting of biodegradable materials, the method consisting essentially of:

forming a pulp slurry comprising:

dried and ground beer byproduct, plant fibers, an environment-friendly, water-repellent chemical, and water;

injecting the pulp slurry into a mold having an interior cavity in the shape of at least one multi-ring can holder;

applying pressure and heat to the mold containing the pulp slurry to produce at least one edible multi-ring can holder from only biodegradable materials; and wherein the edible multi-ring can holder has a strength, rigidity, and flexibility suitable to carry beverage cans attached to each ring of the multi-ring can holder by a top of the beverage can; and wherein the flexibility of the edible multi-ring can holder allows for an inner circumference of each ring to expand so when the can is inserted the ring is enlarged and then springs back onto the can.

20. The method of claim 19 wherein the pulp slurry comprises:

approximately 65% to approximately 98% by weight of the plant fibers; approximately 2% to approximately 8% by weight of the environment-friendly, water-repellent chemical; and approximately 0.5% to approximately 30% by weight of the ground pulp byproduct.

21. An edible multi-ring can holder made of only biodegradable materials, comprising:

dried and ground beer by-product;

plant fibers; and an environment-friendly, water-repellent chemical; and wherein the edible multi-ring can holder has strength, rigidity, and flexibility suitable to carry beverage cans attached to each ring of the multi-ring can holder by a top of the beverage can; and wherein the flexibility of the edible multi-ring can holder allows for an inner circumference of each ring to expand so when the can is inserted the ring is enlarged and then springs back onto the can.

22. The edible biodegradable multi-ring can-holder of claim 21 wherein the beer by-product comprises one or more of barley, wheat, corn, rice, rye, and oat.

23. The edible biodegradable multi-ring can-holder of claim 21 wherein the plant fibers comprise one or more of wheat straw, bamboo, sugar cane, and miscanthus.

24. The edible biodegradable multi-ring can-holder of claim 21 wherein the plant fibers comprise a mixture of at least two of wheat straw, bamboo, sugar cane, and miscanthus.

25. The edible biodegradable multi-ring can-holder of claim 21 wherein the biodegradable materials further comprise an environment-friendly oil-repellent chemical.

26. The edible biodegradable multi-ring can-holder of claim 21 wherein the environment-friendly water-repellent chemical is alkyl ketene dimer (AKD).

27. The edible biodegradable multi-ring can-holder of claim 21 wherein the multi-ring can-holder is disinfected.

* * * * *